July 9, 1968    T. F. BELL ETAL    3,391,844
APPARATUS FOR FEEDING WIRE AND SOLDER AND THE LIKE
Filed April 28, 1964    3 Sheets-Sheet 1
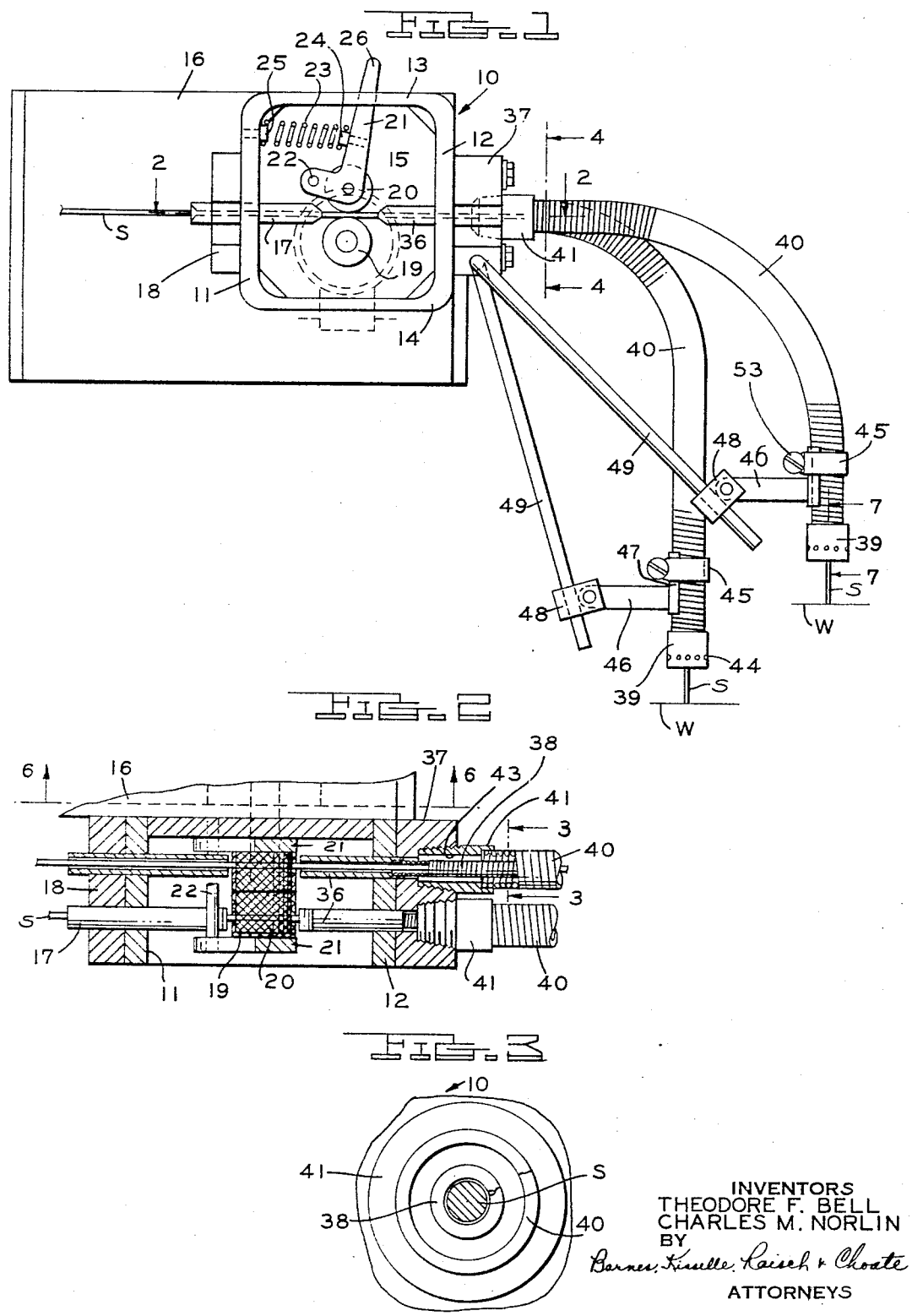
INVENTORS
THEODORE F. BELL
CHARLES M. NORLIN
BY
Barnes, Kisselle, Raisch & Choate
ATTORNEYS

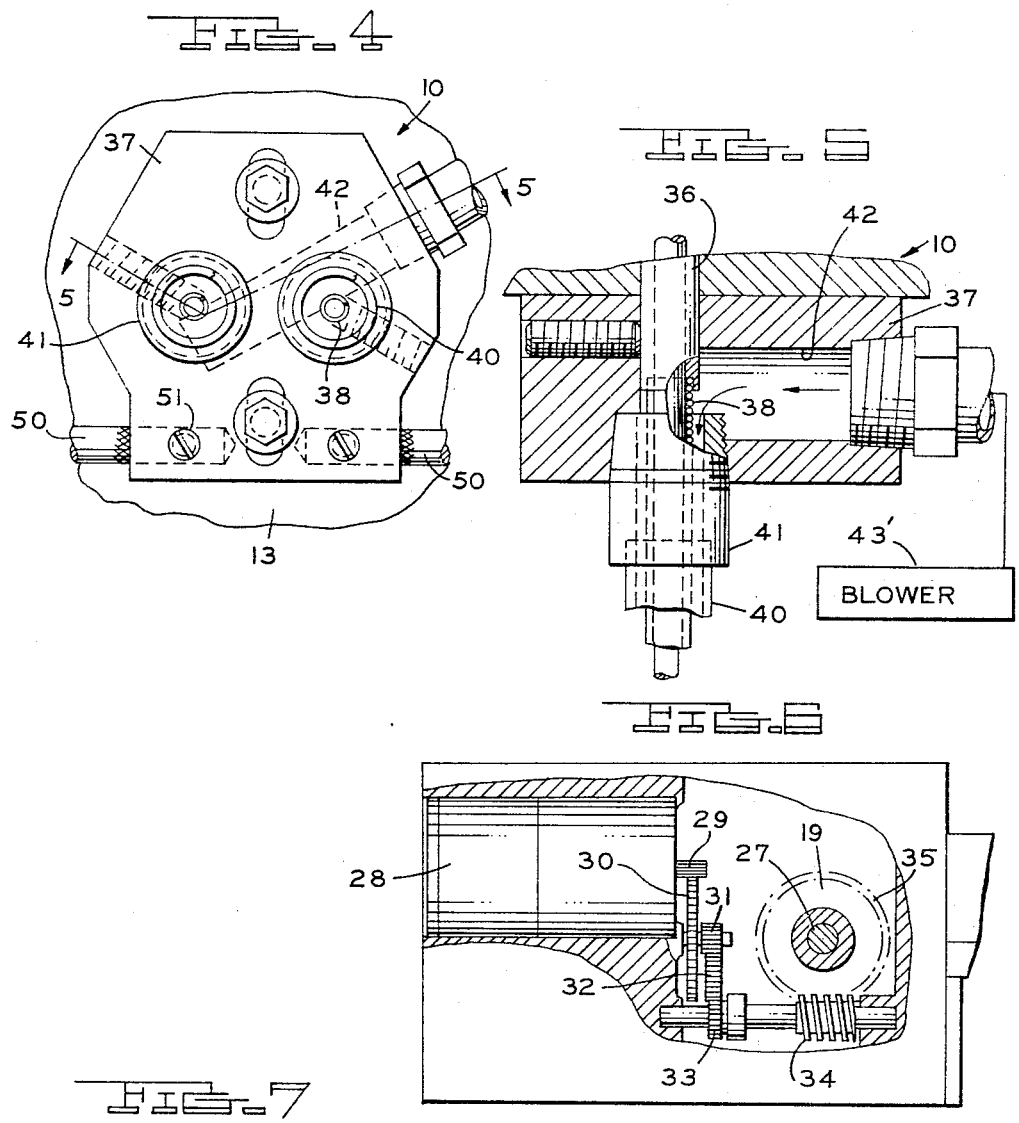
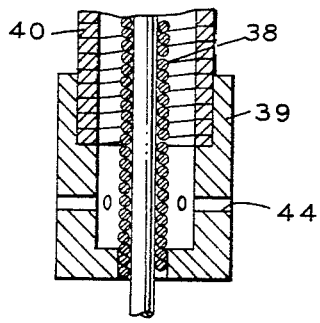

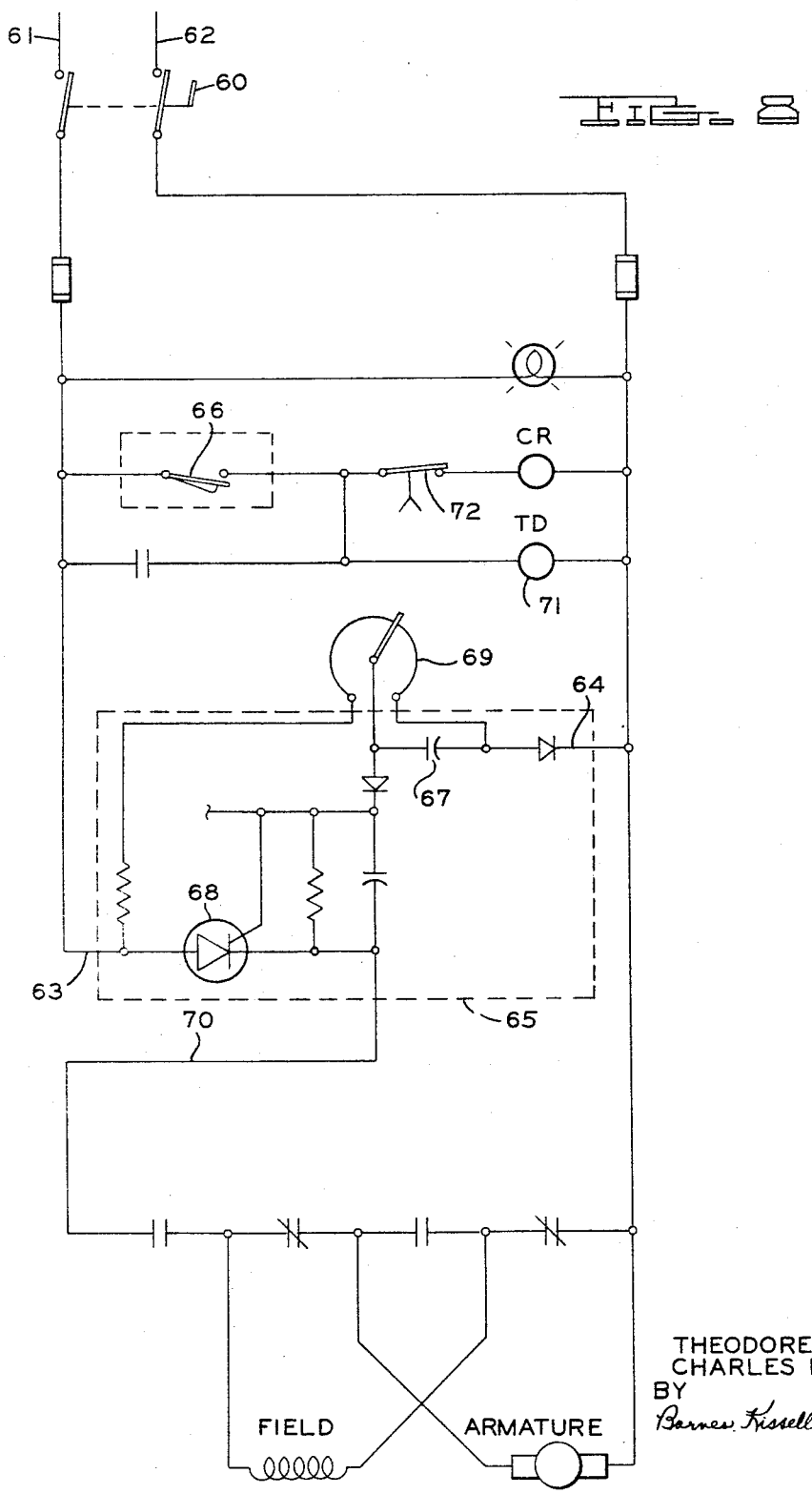

United States Patent Office 3,391,844
Patented July 9, 1968

3,391,844
APPARATUS FOR FEEDING WIRE AND
SOLDER AND THE LIKE
Theodore Fredrick Bell, 22513 Milienbach, St. Clair,
Shores, Mich. 48081, and Charles M. Norlin, 24439
Patricia, Warren, Mich. 48091
Filed Apr. 28, 1964, Ser. No. 363,256
9 Claims. (Cl. 228—41)

ABSTRACT OF THE DISCLOSURE

The apparatus for feeding solder and the like disclosed herein comprises a pair of feed rolls, a first tubular guide for guiding a continuous length of solder or the like between the feed rolls and a second tubular guide for receiving the solder or the like. At least a portion of the second tubular guide is flexible. An outer tubular casing is provided around the second tubular guide and has a corresponding flexible portion and cooling fluid is applied between the second tubular guide and the outer tubular casing.

This invention relates to apparatus for feeding solder and other soft welding and brazing materials to a work area.

In the automatic soldering of parts to one another, it is desirable to feed solder automatically to the work area where heat is applied to the surface which is to be soldered.

It is an object of this invention to provide an apparatus for feeding solder and the like to a work area wherein minimum heat transfer to the solder occurs until the solder is at the work area.

It is a further object of the invention to provide such an apparatus where the solder can be fed in accurate predetermined increments at various speeds including extremely slow feed rates.

In the drawings:

FIG. 1 is an elevation of an apparatus embodying the invention.

FIG. 2 is a fragmentary sectional view on an enlarged scale taken along the line 2—2 in FIG. 1.

FIG. 3 is a sectional view on an enlarged scale taken along the line 3—3 in FIG. 2.

FIG. 4 is a sectional view on an enlarged scale taken along the line 4—4 in FIG. 1.

FIG. 5 is a fragmentary sectional view taken along the line 5—5 in FIG. 4.

FIG. 6 is a fragmentary view of a portion of the apparatus shown in FIG. 1, parts being broken away.

FIG. 7 is a fragmentary sectional view on an enlarged scale taken along the line 7—7 in FIG. 1.

FIG. 8 is a schematic wiring diagram of the electrical current utilized in the apparatus.

Referring to FIG. 1, an apparatus is shown for feeding predetermined lengths of solder to work areas. The apparatus shown is adapted to feed two lengths of solder wire simultaneously to two work areas. As will be apparent from further description of the apparatus, one or more lengths may be fed by the apparatus made according to the invention.

As shown, the apparatus comprises a housing 10 including side walls 11, 12, top wall 13, bottom wall 14, and end wall 15. Housing 10 is mounted on the casing 16 of a drive mechanism.

Each length of solder S is guided into the housing 10 by an inlet guide tube 17 mounted on a block 18 fixed to the side wall 11. Each inlet guide tube 17 guides a length of solder wire S between a drive roll 19 and one of pressure rollers 20.

Drive roller 19 extends across the housing 10 and a plurality of pressure rollers 20 are yieldingly urged into engagement with it. Each pressure roller 20 is mounted on an arm 21 that is pivoted to a pin 22. A helical spring 23 is compressed between a projection 24 on the arm 21 and a similar projection 25 on the side wall 11 to yieldingly urge arm 21 and pressure roller 20 against drive roller 19. A portion 26 of the arm projects upwardly through an opening in the top wall 12 to serve as a means for grasping the arm 21 and moving it, to the left as shown in FIG. 1, to permit the solder that is to be introduced between the drive roller 19 and the pressure roller 20. Drive roller 19 and pressure rollers 20 are knurled.

As shown in FIG. 6, the drive roller 19 is fixed on a shaft 27 that extends through the end wall 15 of housing 10 and into the casing 16. The drive shaft 27 is driven by an electric motor 28 that has an output pinion 29 engaging a gear 30 which in turn drives a pinion 31, gear 32, gear 33 and a worm 34 meshed with a gear 35 fixed on the shaft 27. Motor 28 is energized periodically as required by the operation of the entire soldering machine to feed a predetermined quantity of the solder wire to the work area at a predetemined rate.

Referring to FIG. 2, as solder wire S is fed by the rollers 19, 20, it is guided by an outlet tube 36, each length of which is mounted on a second block 37 fixed to the side wall 2, into a guide assembly that includes an inner flexible guide tube 38. As shown in FIG. 2, one end of flexible guide tube 38 is fixed within the outlet guide tube 36. Flexible guide tube 38 is made of a tightly wound helical spring. The other end of the tube 38 is mounted in a fitting 39 (FIG. 7) so that the solder wire is guided by the fitting to the work area W (FIG. 1).

In order to cool the solder wire as it is moving to the work area and prevent heat from the work area from melting the solder wire before it reaches the work area, an outer flexible tube 40 is provided in surrounding relation to the flexible tube 38. Outer tube 40 is made of a flexible conduit such as a helically-wound interlocked sheet metal conduit and has one end thereof fixed to a nipple 41 that is threaded into block 37 and the other end thereof fixed to fitting 39.

As shown in FIGS. 4 and 5, block 37 is provided with an inlet passage 42 to which air under pressure is supplied by a blower 43'. The passage 42 extends within the block and communicates with the hollow open end 43 of each nipple 41 so that the air will pass, in the direction as shown in FIG. 5, between the inner flexible tube 38 and the outer flexible tube 40 to the fitting 39 and then outwardly through radial openings 44.

In order to support the end of each of the fittings 39 adjacent the work area, a U-shaped bracket 45 is clamped about the tube 40 adjacent fitting 39 and a bracket 46 having a base portion 47. Bracket 46 is pivoted to another clamp 48 that is clamped on the end of a rod 49. Rod 49 has the upper end thereof bent inwardly as at 50 and extending into an opening 51 in the block 37. A set screw 51 holds the rod in angularly adjusted position relative to the block. By loosening set screw 51 and pivoting rod 49, the angle at which the bracket 46 supports the fitting 39 can be varied. By loosening clamping bolt 53, further adjustment can be achieved.

A schematic diagram of the electrical circuit for the soldering apparatus is shown in FIG. 8. A master switch 60 controls flow of current through lines 61, 62 from a source of alternating current. The current is applied across the lines 63, 64 of a motor control unit 65. As the soldering machine is operated, a switch 66 initiates the solder feed cycle. At the beginning of the cycle of each sinusoidal wave of alternating electric current, condenser 67 is charged gradually until the charge is sufficient to fire silicon-controlled rectifier 68. The charging rate of condenser 67 is set by potentiometer 69. When the silicon-controlled rectifier fires, current is applied to the motor through leads 64, 70. By varying the setting of potentiometer 69, the effective voltage applied to the motor is varied so that it, therefore, is possible to vary the speed of the motor. A time delay 71 operates after a predetermined interval of time to open a time-delayed switch 72 and stop the operation of the motor after solder wire has been fed for a predetermined period of time and at a predetermined rate.

The circuit shown in FIG. 8 provides that any back EMF produced by the motor with increasing load is fed back and added to the voltage applied to condenser 67 so that the condenser is charged sooner on every cycle of alternating current and, therefore, the motor operates at a predetermined speed to deliver a constant torque.

It can thus be seen that there has been provided an apparatus for feeding solder or the like automatically to a work area where heat is applied to the surface which is to be soldered; wherein a minimum of heat transfer to the solder occurs; and wherein the solder can be fed in accurate predetermined increments at various speeds without the use of mechanical gear reduction and the like.

What is claimed is:

1. In an apparatus for feeding solder and the like, the combination comprising:
   a frame,
   a first feed roll rotatably mounted in said frame,
   a second feed roll rotatably mounted in said frame,
   means yieldingly urging said second feed roll toward said first feed roll,
   an electric motor having an output shaft operatively connected to said first feed roll,
   a block mounted on said frame and having a tubular guide member thereon for guiding a continuous length of solder or the like between the feed rolls,
   a second block mounted on said frame and having a second tubular guide member thereon for receiving the solder or the like fed from between said feed rolls,
   a guide assembly having one end thereof mounted on said second guide block in alignment with said second tubular guide member and the other end thereof extending to a work area,
   said guide assembly comprising an inner flexible tube,
   an outer flexible tube surrounding said inner flexible tube,
   means sealing the ends of said outer flexible tube to said inner flexible tube,
   said second guide block having an inlet for cooling fluid and a passage providing communication from said inlet in said block to the space between said inner flexible tube and said outer flexible tube,
   means defining an outlet adjacent the end of said guide assembly near said work area for permitting the cooling fluid between said inner and outer flexible tubes to escape,
   and means operable periodically to electrically connect a source of alternating current with the said motor to energize said motor and rotate said feed rolls for a predetermined interval of time at a predetermined rate.

2. The combination set forth in claim 1 including a rod pivoted to said second block,
   and a bracket assembly adjustably mounted on the said rod and on said free end of said guide assembly to hold the free end of said guide assembly in predetermined relation to the work area.

3. The combination set forth in claim 2 wherein said bracket assembly comprises:
   a first clamp member surrounding said rod,
   a second clamp member surrounding a portion of said outer flexible tube,
   and an element pivoted at one end to one of said clamp assemblies and clamped at its other end by the other of said clamp assemblies.

4. In an apparatus for feeding solder and the like, the combination comprising:
   a frame,
   a first feed roll rotatably mounted in said frame,
   a second feed roll suitably mounted in said frame,
   means yieldingly urging said second feed roll toward said first feed roll,
   an electric motor having an output shaft operatively connected to said first feed roll,
   a block mounted on said frame and having a tubular guide member therein extending into said casing adjacent said feed rolls for guiding a continuous length of solder or the like between the feed rolls,
   a second block mounted on said frame and having a second tubular guide member extending into said casing adjacent said feed rolls for receiving the solder or the like fed from between said feed rolls,
   a guide assembly having one end thereof mounted on said second guide block in alignment with said second tubular guide member and the other end thereof extending to a work area,
   said guide assembly comprising an inner flexible tube,
   an outer flexible tube surrounding said inner flexible tube,
   means sealing the ends of said outer flexible tube to said inner flexible tube,
   said second guide block having an inlet for cooling fluid and a passage communicating to said block with the space between said inner flexible tube and said outer flexible tube,
   means defining an outlet adjacent the free end of said guide assembly for permitting the cooling fluid between said inner and outer flexible tube to escape to the work area,
   means operable periodically to electrically connect a source of alternating current with the said motor to energize said direct motor and rotate said feed rolls for a predetermined interval of time at a predetermined rate,
   and means for varying the voltage of said alternating current.

5. In an apparatus for feeding solder and the like, the combination comprising:
   a frame,
   a first feed roll rotatably mounted in said frame,
   a second feed roll rotatably mounted in said frame,
   means yieldingly urging said second feed roll toward said first feed roll,
   a block mounted on said frame and having a tubular guide member thereon for guiding a continuous length of solder or the like between the feed rolls,
   a second block mounted on said frame and having a second tubular guide member thereon for receiving the solder or the like fed from between said feed rolls,
   a guide assembly having one end thereof mounted on said second guide block in alignment with said second tubular guide member and the other end thereof extending to a work area,
   said guide assembly comprising an inner flexible tube,
   an outer flexible tube surrounding said inner flexible tube,
   means sealing the ends of said outer flexible tube to said inner flexible tube,
   said second guide block having an inlet for cooling fluid and a passage providing communication from said inlet in said block to the space between said inner flexible tube and said outer flexible tube,
   and means defining an outlet adjacent the end of said guide assembly near said work area for permitting the cooling fluid between said inner and outer flexible tubes to escape.

6. The combination set forth in claim 5 including a rod pivoted to said second block, and a bracket assembly adjustably mounted on the said rod and on said free end of said guide assembly to thereby hold the free end of said guide assembly in predetermined relation to the work area.

7. The combination set forth in claim 6 wherein said bracket assembly means comprises:

a first clamp member surrounding said rod, a second clamp member surrounding a portion of said outer flexible tube, and an element pivoted at one end to one of said plant clamp assemblies and clamped at its other end by the other of said clamp assemblies.

8. In an apparatus for feeding solder and the like, the combination comprising:

a pair of feed rolls between which an uninterrupted length of solder is fed, a first tubular guide adjacent said feed rolls for guiding a continuous length of solder or the like between the feed rolls, a second tubular guide adjacent said feed rolls for receiving the solder or the like which is fed by said feed rolls, at least a portion of said second tubular guide being flexible to permit change of direction of the solder, and an outer tubular casing surrounding said second tubular guide and having a corresponding flexible portion, said outer tubular casing having an inlet to which cooling fluid may be supplied and an outlet adjacent the free end of said tubular guide through which the cooling fluid may leave the space between said second tubular guide and the tubular casing.

9. The combination set forth in claim 8 including a direct current electric motor, means interconnecting the direct current electric motor and one of the feed rolls, a source of alternating current, means electrically connecting said current source and said motor, and means operable to periodically connect said current with said motor for a predetermined interval of time in order to feed a predetermined length of solder or the like.

References Cited

UNITED STATES PATENTS

| | | | |
|---|---|---|---|
| 2,748,236 | 5/1956 | Landis et al. | 219—130 |
| 3,283,235 | 11/1966 | Auld et al. | 318—331 |
| 3,014,447 | 12/1961 | Walker et al. | 228—41 |
| 3,226,526 | 12/1965 | Shearer | 219—130 |
| 3,253,116 | 5/1966 | Kensrue | 219—130 |
| 3,309,594 | 3/1967 | Belt et al. | 318—331 |
| 3,316,472 | 4/1967 | Taylor | 318—331 |

RICHARD H. EANES, JR., *Primary Examiner.*